J. Chase,
Water Wheel.
No. 98,141. Patented Jan. 11. 1870.

Witnesses:
Fred. Haynes
J. Shauly

John Chase

United States Patent Office.

JOHN CHASE, OF PATERSON, NEW JERSEY.

Letters Patent No. 98,741, dated January 11, 1870.

IMPROVEMENT IN SCROLL-CASES FOR WATER-WHEELS.

The Schedule referred to in these Letters Patent and making part of the same

*To all whom it may concern:*

Be it known that I, JOHN CHASE, of Paterson, in the county of Passaic, and State of New Jersey, have invented a new and useful Improvement in Scroll-Cases for Water-Wheels, of which the following is a full, clear, and exact description, reference being had to the accompanying drawing, forming part of this specification, and in which—

Figure 1:
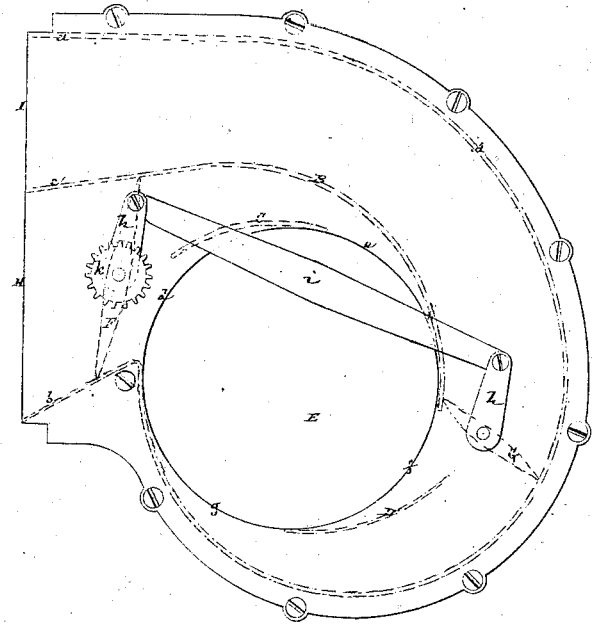
Figure 2:
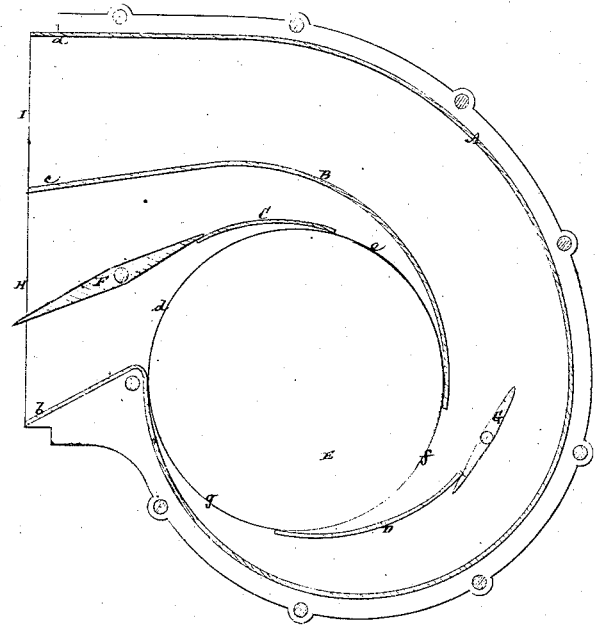

Figure 1 represents a plan of a water-wheel case, constructed according to my improvement, and Figure 2, a horizontal section of the same.

Similar letters of reference indicate corresponding parts.

My improvement has reference to water-wheels of a horizontal character, that is, hung so that their shafts occupy a vertical position, irrespective of the courses which the water is made to take through the wheel, or any precise construction of the latter, as regards the lines or directions of the entry and discharge of the water, or impinging action of it in passing through the wheel.

The invention consists in the novel construction of scroll-case, within which the wheel works, in combination with a certain arrangement of valves or gates, for dividing up the water to equalize the pressure on or around the wheel, and whereby each gate is made to control two passages, and the several gates, that are preferably of a balance-character, may be operated simultaneously, to open and close the discharge through the case or flume, and to regulate the supply of water to the wheels. By this improvement, I do away, in a simple and effective manner, with that one-sided pressure consequent on unequal distribution of the water around the wheel, which is incidental to scroll-cases, and obtain a like advantage, as regards exemption from such one-sided pressure, at a much less expense or reduced first cost, to that secured by a wheel arranged at the bottom of a square flume.

Referring to the accompanying drawing, the scroll-case there represented, is made up of an outer shell or wall, A, and inner wall or vertical scroll partitions, B, C, and D, so arranged around the wheel-race or opening E in the case, and of such lengths, as, in connection with suitably-shaped mouth or flume-portions, *a b*, of the outer wall, and extension *c*, of the inner wall or scroll-partition B, to divide up or distribute the water to or through outlets *d, e, f,* and *g,* at equal distances, or thereabout, or in a spread manner, around the race E, the scrolls directing the water to lap the wheel.

Said case is, furthermore, provided with balance-gates or valves F and G, which serve, in conjunction with the inner and outer vertical partitions or walls, to direct the water to or along the scroll-courses established for the run of it through the case to the wheel.

Thus, when said valves occupy a fully open position, as represented in fig. 2, or when only partially open, they, in connection with said wall and partitions, operate to direct the water entering at the flumes or mouths H and I, of the case, to the outlets *d, e, f,* and *g,* the water entering at H, passing to the outlets *d* and *e,* while that which comes in at I, is conducted to the outlets *f* and *g.* These valves or gates also serve, accordingly as they are more or less opened, to regulate the amount of water to the wheel, and when closed, as represented in fig. 1, to shut off supply altogether, each of said valves, by its construction and arrangement, as shown, controlling two passages or water-courses through the case.

It is preferred to gear or connect these valves F and G either by means of cranks *h h,* and connecting-rod *i,* as shown in fig. 1, or in any other suitable manner, so that they are worked or opened and closed in concert, by power applied to a single point, as, for instance, to the one valve, F, by or through a pinion, *k,* which may be connected with a governor, or said valves may be operated by hand.

It appears almost unnecessary to observe, that the same principle of construction as is here shown, and which accomplishes the end hereinbefore specified, as the object or result of the invention, may be indefinitely, as it were, carried out, that is, the number of water-courses through the case, and number of valves, each controlling two passages, may be increased, and the several valves geared to work in unison.

What is here claimed, and desired to be secured by Letters Patent, is—

The scroll-case, constructed of outer and inner walls or partitions, arranged to form independent scroll-courses, and divided outlets around the wheel-race, in combination with valves or gates, each made to control two passages, substantially as specified.

JOHN CHASE.

Witnesses:
 FRED. HAYNES,
 HENRY PALMER.